United States Patent
Hanson et al.

(10) Patent No.: US 9,308,944 B2
(45) Date of Patent: Apr. 12, 2016

(54) TILTING HOOD ASSEMBLY HAVING FENDER-MOUNTED HANDLE

(71) Applicant: Caterpillar Inc., Peoria, IL (US)

(72) Inventors: Eric Hanson, Valparaiso, IN (US); Curt Wilson, Naperville, IL (US); Christian Hardin, Waterford, MI (US); G. L. Pabst, Davisburg, MI (US); James L. Smith, Jr., Batavia, IL (US); Robert D Charles, West Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/274,196

(22) Filed: May 9, 2014

(65) Prior Publication Data

US 2015/0284032 A1  Oct. 8, 2015

Related U.S. Application Data

(60) Provisional application No. 61/975,114, filed on Apr. 4, 2014.

(51) Int. Cl.
| | |
|---|---|
| *B62D 25/18* | (2006.01) |
| *B60Q 1/04* | (2006.01) |
| *B60Q 1/26* | (2006.01) |
| *B62D 25/12* | (2006.01) |
| *B62D 25/16* | (2006.01) |

(52) U.S. Cl.
CPC ............ *B62D 25/182* (2013.01); *B60Q 1/0408* (2013.01); *B60Q 1/2619* (2013.01); *B62D 25/12* (2013.01); *B62D 25/168* (2013.01)

(58) Field of Classification Search
CPC .... B62D 25/182; B62D 25/184; B62D 25/10; B62D 25/12; B62D 33/067; B62D 33/07; E05B 83/243; Y10S 292/14; B60Q 1/0408; B60Q 1/2619

USPC ............ 180/69.2, 69.21; 296/180.2, 190.08, 296/190.09, 190.11
See application file for complete search history.

(56) References Cited

U.S. PATENT DOCUMENTS

| | | | |
|---|---|---|---|
| D286,031 S | 10/1986 | Breitschwerdt et al. | |
| 4,813,736 A | 3/1989 | Schubert et al. | |
| 4,971,172 A * | 11/1990 | Hoffman et al. | 180/68.3 |
| 5,101,921 A * | 4/1992 | West et al. | 180/69.21 |
| 5,826,672 A * | 10/1998 | Holter et al. | 180/69.21 |
| 5,984,037 A | 11/1999 | Duhem | |
| 6,394,211 B1 * | 5/2002 | Palenchar et al. | 180/69.21 |
| 6,454,035 B1 * | 9/2002 | Waskow et al. | 180/89.17 |
| D467,202 S | 12/2002 | Mondragon Sarmiento et al. | |

(Continued)

OTHER PUBLICATIONS

Design U.S. Appl. No. 29/489,940 entitled "Fender Flare", filed Apr. 4, 2014.

(Continued)

*Primary Examiner* — John Walters
*Assistant Examiner* — Brian Swenson
(74) *Attorney, Agent, or Firm* — Finnegan, Henderson, Farabow, Garrett & Dunner, LLP

(57) ABSTRACT

A hood assembly is disclosed for use with a machine having a power source and an operator station. The hood assembly may have a hood configured to at least partially cover the power source, and a hinge located at an end of the hood away from the operator station. The hood assembly may also have a fender located at a transverse side of the hood, and a handle formed within one of the fender and the hood at an end near the operator station.

19 Claims, 6 Drawing Sheets

(56) References Cited

U.S. PATENT DOCUMENTS

| | | | |
|---|---|---|---|
| 6,666,291 B2 | 12/2003 | Hyslop et al. | |
| 7,686,365 B2 * | 3/2010 | Thelen et al. | 296/37.6 |
| D619,049 S | 7/2010 | Beigel et al. | |
| D623,091 S | 9/2010 | Beigel et al. | |
| D623,092 S | 9/2010 | Beigel et al. | |
| D632,224 S | 2/2011 | Peltola et al. | |
| D653,994 S | 2/2012 | Fukushima et al. | |
| 8,408,608 B2 | 4/2013 | Wilkens et al. | |
| D685,294 S | 7/2013 | Hanson et al. | |
| 2003/0155162 A1 * | 8/2003 | Sorvari | 180/69.2 |
| 2005/0284678 A1 * | 12/2005 | Muia-Longman | 180/69.21 |
| 2009/0113720 A1 * | 5/2009 | Delillo | 30/162 |
| 2010/0096202 A1 * | 4/2010 | Bonsen | 180/69.21 |
| 2012/0256438 A1 * | 10/2012 | Watkins | 296/37.6 |
| 2013/0062894 A1 * | 3/2013 | Critchley | 293/149 |
| 2014/0084609 A1 * | 3/2014 | Momii et al. | 293/155 |

OTHER PUBLICATIONS

Design U.S. Appl. No. 29/486,941, entitled "Hood", filed Apr. 4, 2014.

Design U.S. Appl. No. 29/486,942, entitled "Truck Grille And Surround", filed Apr. 4, 2014.

Design U.S. Appl. No. 29/486,943, entitled "Hood", filed Apr. 4, 2014.

Design U.S. Appl. No. 29/486,944, entitled "Hood", filed Apr. 4, 2014.

Design U.S. Appl. No. 29/486,945, entitled "Truck Grille And Surround", filed Apr. 4, 2014.

Design U.S. Appl. No. 29/486,949, entitled "Headlamp", filed Apr. 4, 2014.

Design U.S. Appl. No. 29/486,953, entitled "Headlight", filed Apr. 4, 2014.

Design U.S. Appl. No. 29/486,947, filed Apr. 4, 2014 entitled "Fender Flare".

Design U.S. Appl. No. 29/486,954, entitled "Bumper", filed Apr. 4, 2014.

* cited by examiner

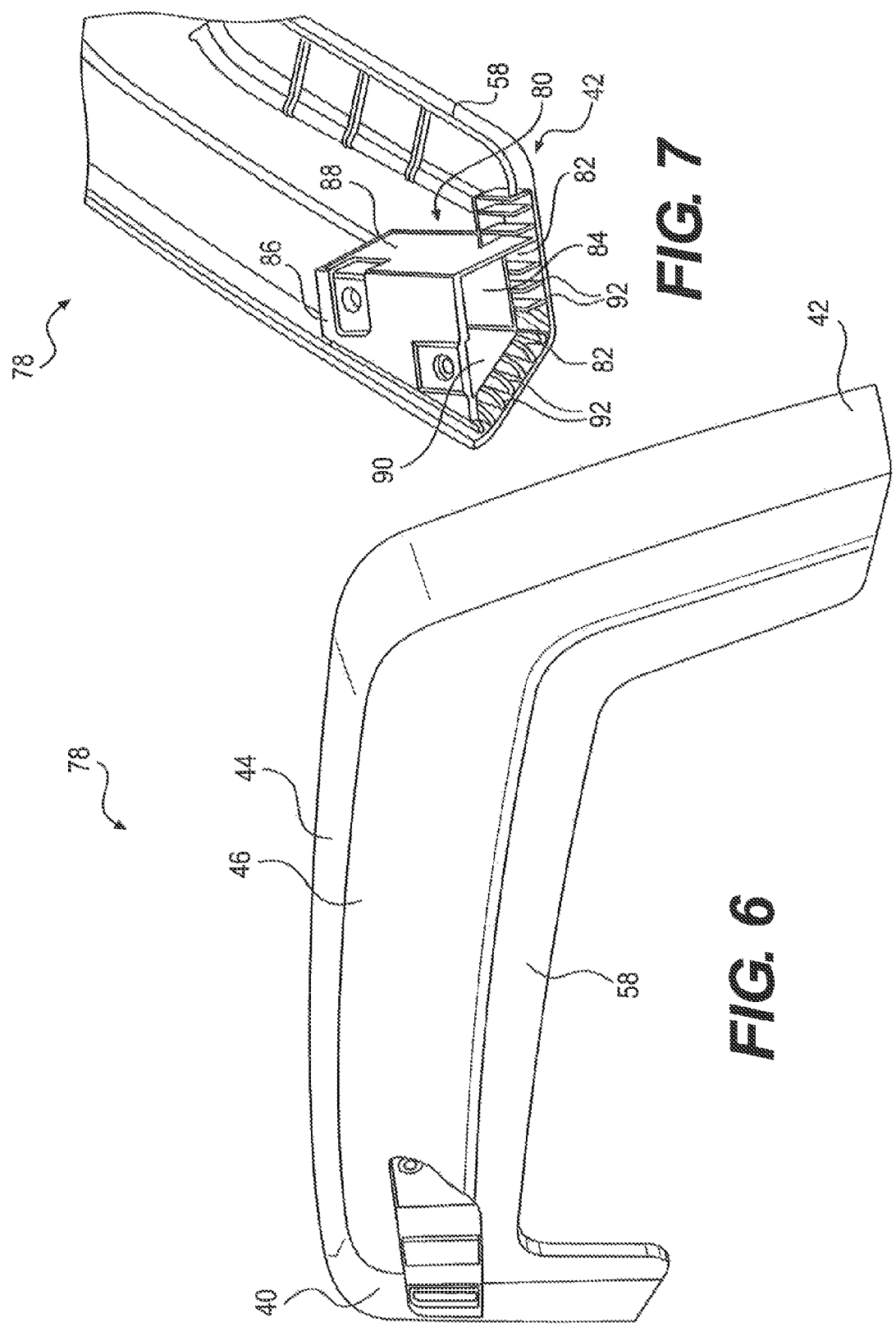

TILTING HOOD ASSEMBLY HAVING FENDER-MOUNTED HANDLE

RELATED APPLICATIONS

This application is based on and claims priority to U.S. Provisional Application No. 61/975,114 filed on Apr. 4, 2014, the contents of which are expressly incorporated herein by reference.

TECHNICAL FIELD

The present disclosure relates generally to a hood assembly and, more particularly, to a tilting hood assembly having a fender-mounted handle.

BACKGROUND

Mobile machines, such as on-highway vocational trucks, semi-trucks, off-highway trucks, etc. are equipped with hoods that enclose an engine and related induction, exhaust, and cooling system components. A conventional hood is hinged at a lower front end, near a bumper, and includes a handle located at a top center of the hood. In order to access the engine or one of the system components, a machine operator must pull forward and downward on the handle to cause the hood to pivot forward about the hinge. Some hoods are provided with shock absorbers that cushion opening and closing of the hood, and/or latches located at sides of the hood to secure the hood from unintentionally opening. An exemplary hood is disclosed in U.S. Design Pat. No. 685,294 that issued on Jul. 2, 2013.

Although conventional hoods with top-mounted handles may be adequate for some applications, they can also be less than optimal in other situations. Specifically, due to ever increasing power demands and regulations regarding engine efficiency, emissions, and power, more room within the engine enclosure is being consumed by specialized equipment required to satisfy the demands and regulations. Accordingly, hoods are becoming larger and taller to enclose this equipment, and the handles on top of the hood are becoming difficult for the machine operator to reach. In addition, the top-mounted handle can require significant force to pull a large hood open and, in combination with side-mounted latches, require a lot of effort and time.

The disclosed hood assembly is directed to overcoming one or more of the problems set forth above and/or other problems of the prior art.

SUMMARY

In one aspect, the present disclosure is directed to a fender for a traction device. The fender may include a generally four-sided structure configured to extend in a width direction of the traction device. The generally four-sided structure may have a leading end and a trailing end relative to a forward travel direction of the traction device, a top side, and an outer side. The fender may also include a handle formed at least partially within the trailing end and the outer side.

In another aspect, the present disclosure is directed to a hood assembly for use with a machine having a power source and an operator station. The hood assembly may include a hood configured to at least partially cover the power source, and a hinge located at an end of the hood away from the operator station. The hood assembly may also include a fender located at a transverse side of the hood, and a handle formed within one of the fender and the hood at an end near the operator station.

In yet another aspect, the present disclosure is directed to a mobile machine. The mobile machine may include a frame, an operator station supported by the frame, and a power source supported by the frame forward of the operator station relative to a forward traveling direction of the mobile machine. The mobile machine may also include at least one traction device rotatably connected to the frame, and a mud guard located between the at least one traction device and the operator station. The mud guard may be operatively connected to the frame. The mobile machine may also include a hood configured to at least partially cover the power source, a hinge operatively connected to the frame and to the hood at an end of the hood away from the operator station, and a fender fixedly connected to a transverse side of the hood. The fender may be configured to abut the mudguard and at least partially enclose the at least one traction device when the hood is in a closed position. The mobile machine may also include a handle connected to at least one of the hood and the fender at an end near the mudguard.

In yet another aspect, the present disclosure is directed to a fender flare for a fender. The fender flare may include a leading end connectable to the fender, a trailing end connectable to the fender, a top disposed between the leading and trailing ends and connectable to the fender, and an outer side connected to the leading end, the trailing end, and the top. The fender flare may also include a box formed inside the fender flare at an intersection of the trailing end and the outer side, the box being spaced apart from the trailing end and the outer side, and a plurality of ribs connecting the trailing end and the outer side to the box.

BRIEF DESCRIPTION OF THE DRAWINGS

FIGS. 6 and 7 are isometric view illustrations of another fender flare that can form a portion of the hood assembly of FIG. 1.

DETAILED DESCRIPTION

Figure 1:
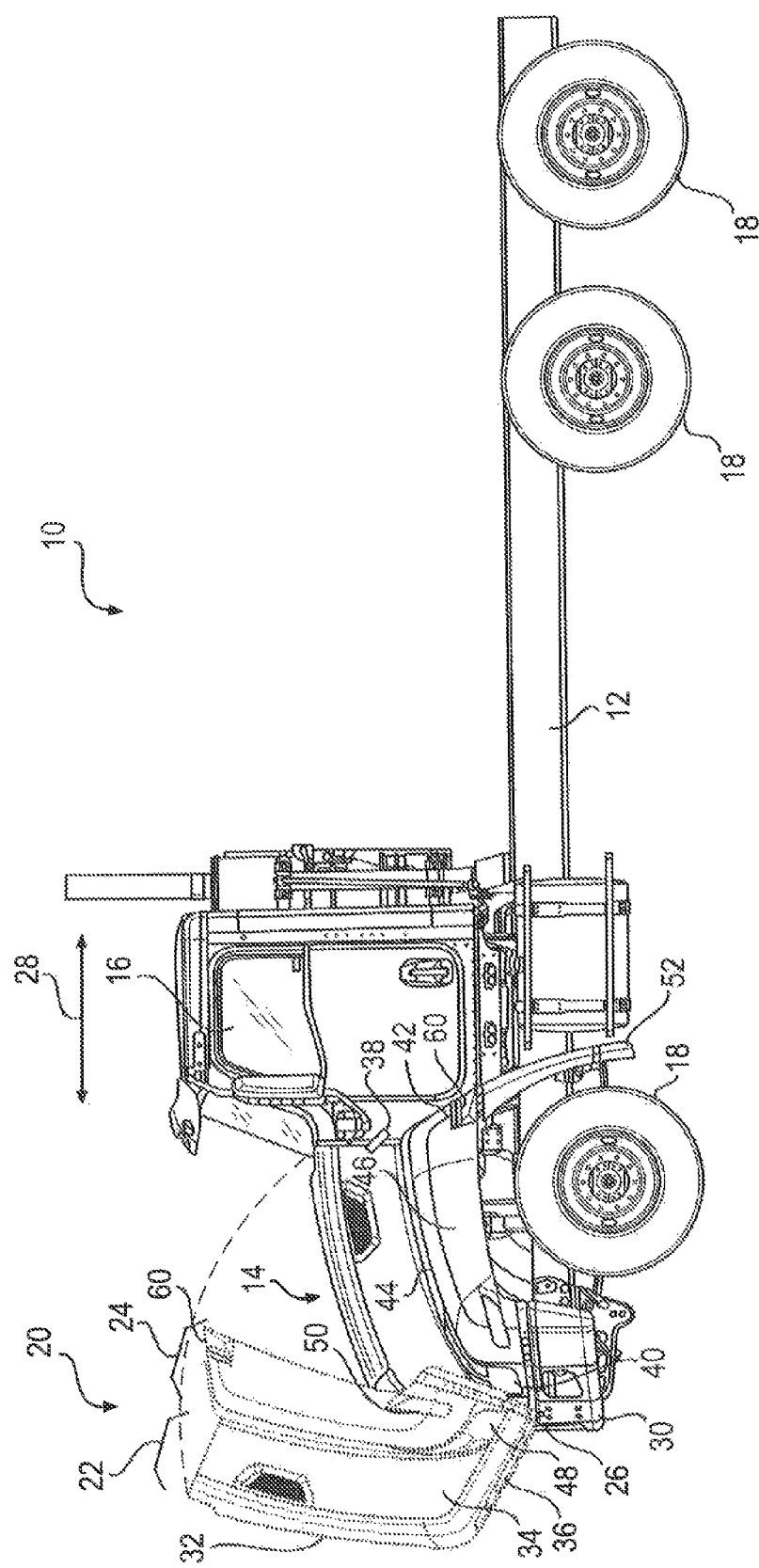
FIG. 1 is side-view illustration of a machine having an exemplary disclosed hood assembly.

FIG. 1 illustrates an exemplary embodiment of a machine 10. Machine 10 may be a mobile machine that performs some type of operation associated with an industry such as construction, farming, mining, long-haul transportation, or another industry known in the art. For example, machine 10 may be an on-highway haul truck (shown in FIG. 1), a dump truck, a cement truck, a semi-truck (tractor/trailer), off-highway truck, bus, or another similar vocational vehicle. In the example of FIG. 1, machine 10 includes a frame 12 that supports a power source 14 forward of an operator station 16, although other machine configurations may also be possible. Machine 10 may also include a plurality of traction devices 18 that are rotatingly connected to machine frame 12 and driven by power source 14 to propel machine 10, and a hood assembly 20 pivotally connected to frame 12 (or another support structure of machine 10) and associated with power source 14.

Operator station 16 may be an onboard location from which an operator of machine 10 observes performance of machine 10 and provides instructions for controlling machine 10. In the disclosed example, operator station 16 is a substantially enclosed structure supported by frame 12 that includes one or more interface devices (not shown) located proximate an operator seat (not shown). It is contemplated, however, that operator station 16 may alternatively be a generally open platform, if desired, and may or may not include a seat (i.e., the operator may be required to stand during control of machine 10).

Traction devices 18 may embody wheels located on each side of machine 10. For example, eight traction devices 18 (only two shown) may be located toward a rear-end of machine 10 and arranged in left and right tandems, while two traction devices 18 may be located toward a front-end of machine 10 (only a left front traction device 18 is shown). Any of front and rear traction devices 18 may be driven and/or steered, as desired. It is also contemplated that one or all of traction devices 18 may be replaced with another type of traction device, if desired, such as tracks or belts.

Hood assembly 20 may function generally to enclose power source 14, and also to block mud and debris thrown into the air by traction devices 18 from contacting critical areas of machine 10 (e.g., operator station 16, power source 14, etc.). Specifically, hood assembly 20 may include a hood 22 and left and right fenders 24 (only the left fender 24 shown) that are connected to pivot together relative to frame 12 at one or more hinges 26. Hinge(s) 26 may extend transversely, relative to a travel direction of machine 10 (represented by an arrow 28), and connect a lower front edge of hood assembly 20 to frame 12 (e.g., by way of a bumper 30). In this configuration, hood assembly 20 may be configured to pivot in a direction generally aligned with the travel direction of machine 10. In some embodiments, one or more shock absorbers (not shown) may be used to cushion the opening and/or closing movements of hood assembly 20.

Hood 22 may be a generally four-sided structure, having an upper panel 32, left- and right-side panels 34 (right side not shown), and a front grill 36. Upper panel 32 may extend over power source 14 and be generally planar, curved, and/or multi-faceted, as desired. In general, a forward end of upper panel 32, which connects to front grill 36, may sit gravitationally lower than a rearward end located at operator station 16 when hood assembly 20 is in a closed position. Left- and right-side panels 34 may be integral with upper panel 32 or fabricated separately and then joined to upper panel 32, as desired. In one embodiment, a latch 38 may be at least partially connected to left- and right-side panels 34 and used to selectively secure hood assembly 20 to operator station 16 in the closed position. Front grill 36 may extend downward from the front end of upper panel 32 to hinge(s) 26 at bumper 30. Front grill 36 may have openings (e.g., apertures, slots, lattice, etc.) that allow ambient air to flow through hood assembly 20 to power source 14. Front grill 36 may connect upper panel 32 and side panels 34 to hinge(s) 26.

Left and right fenders 24 may be annularly positioned around an upper portion of the front-most traction devices 18, and connected to opposing sides of hood 20. Specifically, left and right fenders 24 may be connected to lower edges of left- and right-side panels 34, respectively. Left and right fenders 24, like hood 20, may each be a generally four-sided structure, including a leading end 40, a trailing end 42, a top side 44, and an outer side 46. An inside edge of top side 44 may connect to and/or be integral with a lower edge of side panel 34. And also like hood 20, each of left and right fenders 24 may slope downward toward leading end 40. It is contemplated that each of the components of fender 24 may be separately fabricated and subsequently joined together or, alternatively, one or more of these components may be formed together as a single integral part. Left and right fenders 24 may extend lengthwise from in front of the associated traction device 18, to a location rearward of traction device 18. Left and right fenders 34 may also extend transversely from left- and right-side panels 34 of hood 20 outward an axial distance past an outermost portion of traction devices 18. In other words, left and right fenders 24 may extend in the length direction a distance at least as long as an outer diameter of traction device 18, and extend in a width direction a distance at least as long as an axial depth of traction device 18. In one embodiment, a headlight 48 may be mounted within forward end 40 of each fender 24, and a running or park light 50 may be mounted within outer side 46. Trailing end 42 may come to rest adjacent to and/or on top of a mud guard 52 when hood assembly 20 is closed. For example, an internal surface of fender 24 at trailing end 42 may vertical overlap an internal wall 53 of mud guard 52, and fender 24 may come to rest above an upper horizontal surface 55 of mud guard 52.

Figure 2:
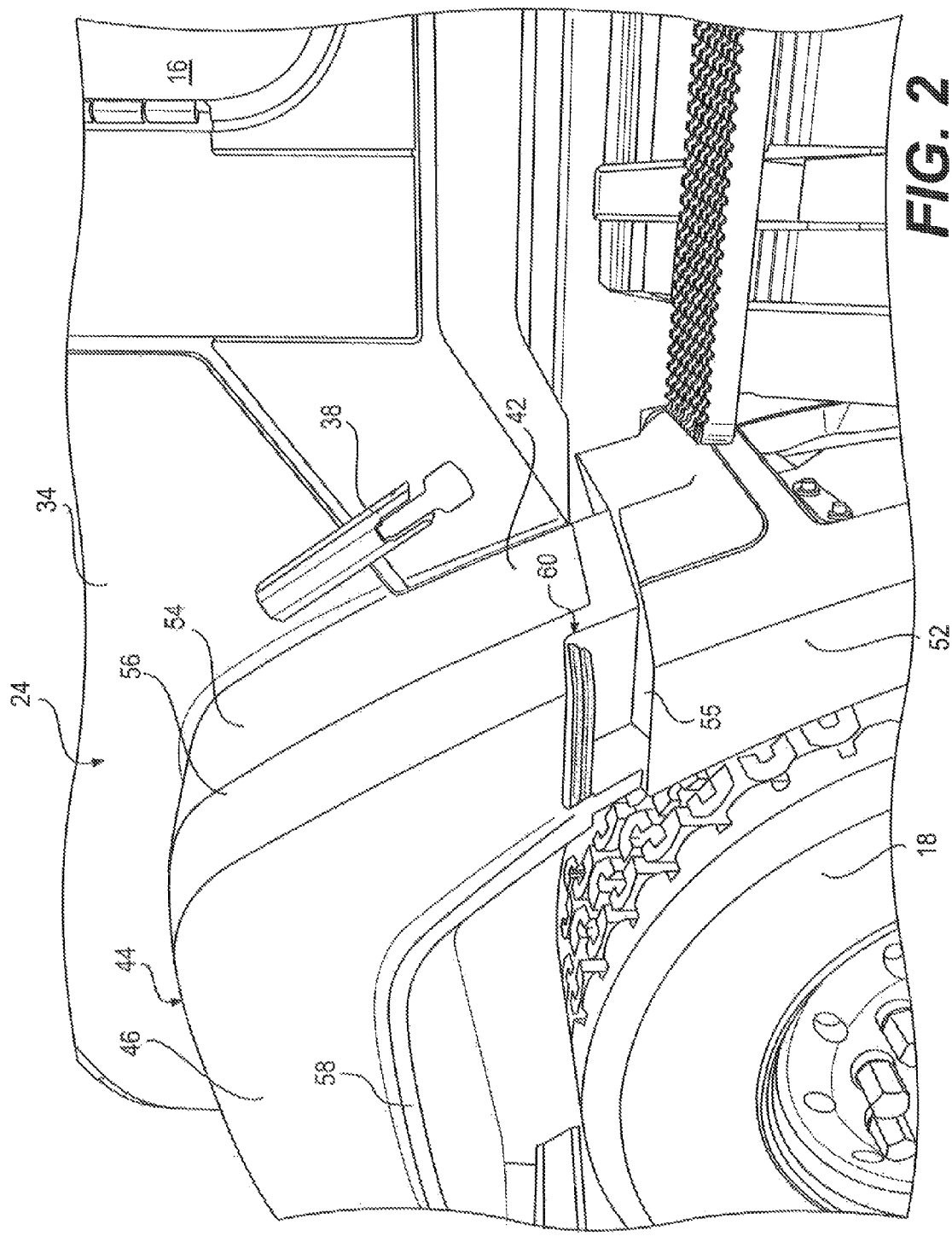
FIG. 2 is an isometric view illustration of the hood assembly of FIG. 1.

As shown in FIG. 2, each of left and right fenders 24 may be a two-part component and fabricated from two different materials. Specifically, each fender 24 may include a modesty panel 54 and a fender flare 56. Modesty panel 54 may be connected between side panel 32 and fender flare 56, and fabricated from a material that is substantially the same as a material from which hood 20 (i.e., upper panel 32 and left- and right-side panels 34) is fabricated. This material may include, for example, a metal (e.g., steel or aluminum), a plastic, or a composite (e.g., fiberglass or carbon fiber). In one embodiment, modesty panel 54 may be integral with the corresponding one of left- and right-side panels 34). Fender flare 56, however, may be fabricated from a more flexible material, such as polyphosphazene-Poly Olefin Oxide (PPO). It is contemplated that mud guard 52 may be fabricated from the same material as fender flare 56, if desired, and both fender flare 56 and mud guard 52 maybe formed through a molding process (e.g., a roto-molding process). Modesty panel 54 and fender flare 56 may be joined to each other along a lengthwise seam, for example by way of chemical bonding and/or mechanical fastening.

Fender flare 56 may form a portion of forward end 40, a portion of trailing end 42, a portion of top side 44, and all of outer side 46 of fender 24. Specifically, fender flare 56, itself, may be generally four-sided structure, but modesty panel 54 may only be a three-sided structure (not having outer side 46). As shown in FIG. 2, an angled lip or annular step 58 may be formed at an external vertical edge of outer side 46 for added rigidity, and a handle 60 may be formed at a rearmost corner or intersection of trailing end 42 and outer side 46 near operator station 16. One or more fasteners 61 (shown in FIGS. 3-5) may connect fender flare 56 to modesty panel 54 at handle 60 for increased strength in lifting and lowering of hood assembly 20 via handle 60.

Handle 60, in the disclosed example, is integrally formed with fender flare 56. For example, handle 60 may be molded into fender flare 56 during formation thereof. Although handle 60 is shown as being recessed within fender flare 56, it is contemplated that handle 60 could alternatively protrude from fender flare 56, if desired. It is also contemplated that handle 60 could be formed as a separate component, and thereafter connected to fender flare 56. It may also be possible for handle 60 to alternatively be connected to side panel 34 at or near latch 38 (e.g., at a rear-most corner of side panel 34).

Figure 3:
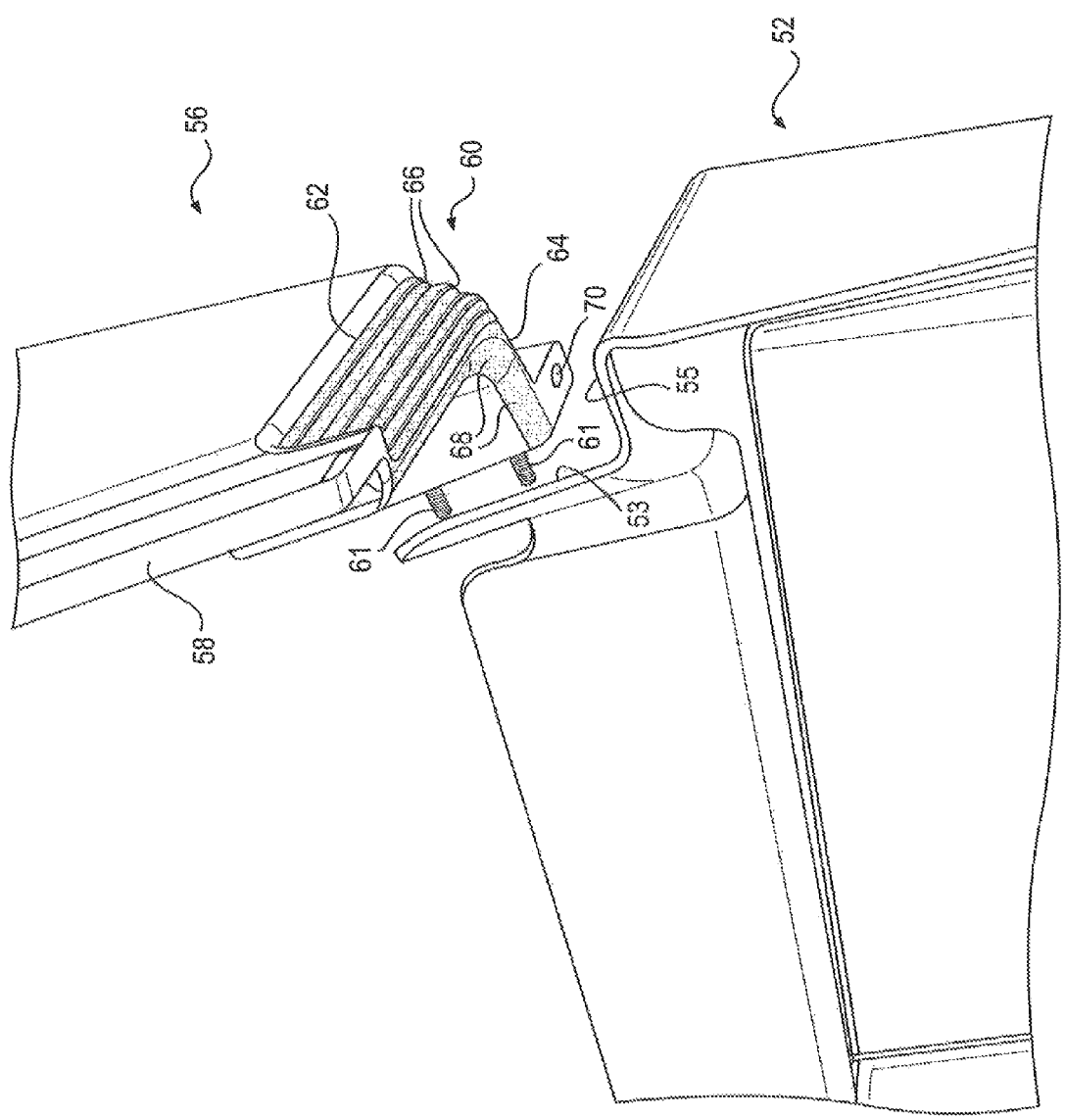
FIGS. 3-5 are isometric view illustrations of a fender flare that can form a portion of the hood assembly of FIG. 1.
Figure 4:
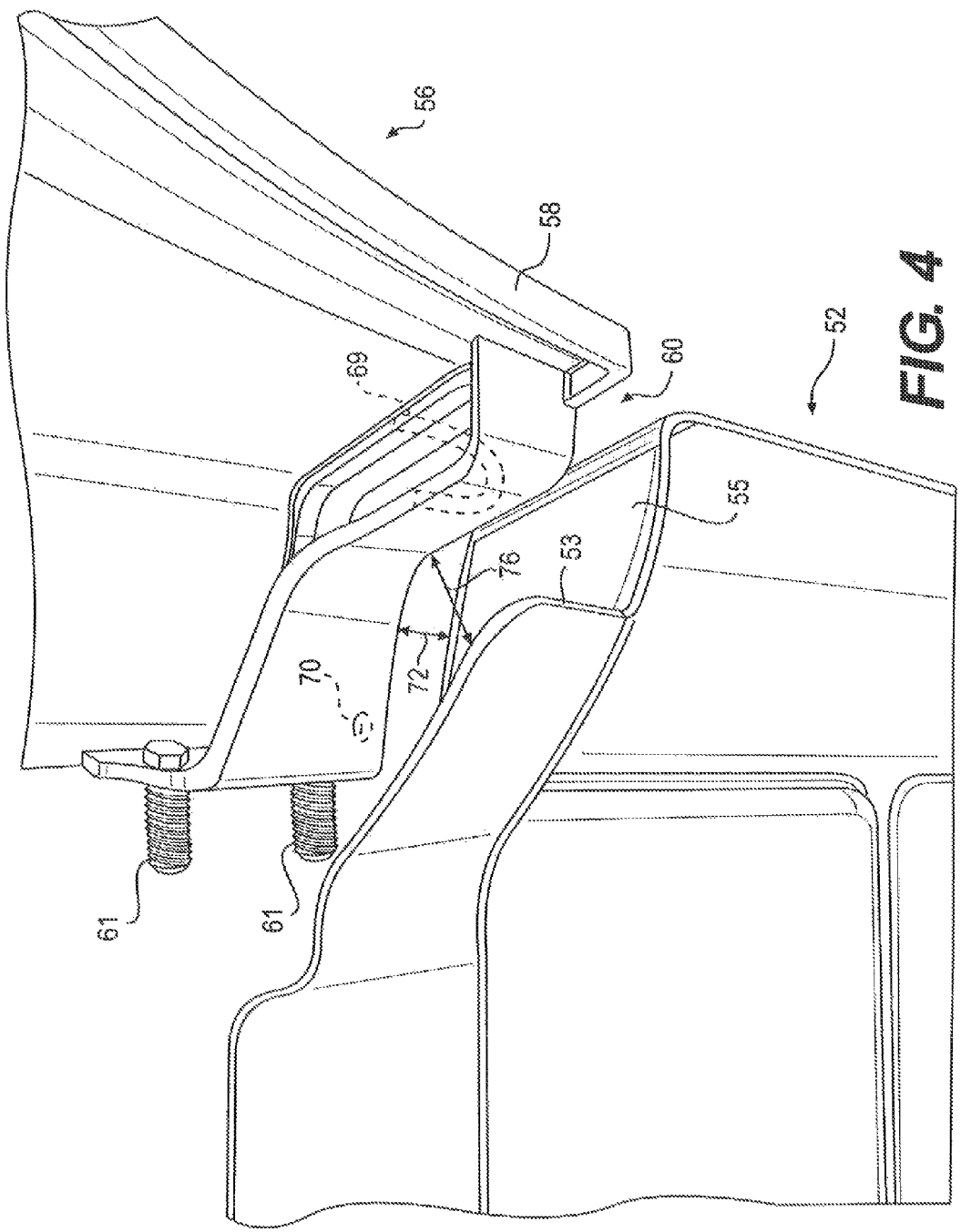
Figure 5:
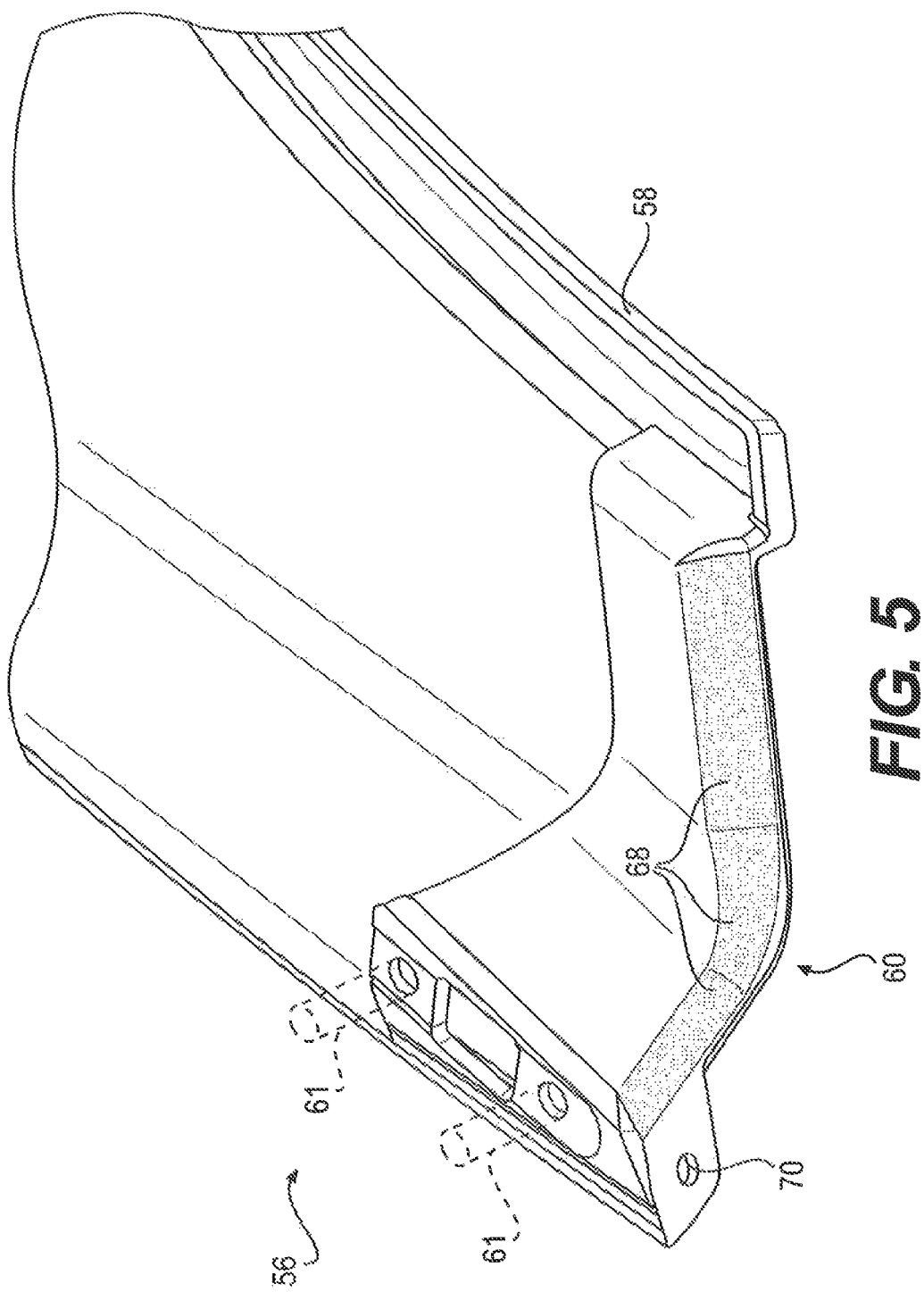

As shown in FIGS. 3-5, handle 60 may include two primary segments 62, 64 formed into a general L-shape, with segment 62 having a greater length. This shape may allow a machine operator to lift up on handle 60 from two different directions.

Specifically, the operator may stand at a first location adjacent fender 24 and lift upward on segment 62, or the operator may stand rearward of fender 24 and lift upward on segment 64. This arrangement may provide the operator with multiple options, allowing for differences in operator stature, strength, and preference. It is contemplated that the operator could alternatively lift upward simultaneously on both segments 62, 64 from any location, if desired.

Handle 60 may have one or more features that improve the grip of the machine operator during lifting of hood assembly 20. In the disclosed example, raised ribs 66 (see FIG. 3) are formed within handle 60 at an external surface and extend in a lengthwise direction along both segments 62 and 64. Handle 60 may include any number of ribs 66, and ribs 66 may have any height and/or spacing desired. In addition to providing texture that improves the operator grip, ribs 66 may also increase a rigidity of handle 60. The location of handle 60 at a corner of fender flare 56, along with the L-shape of handle 60, may further increase this rigidity. Handle 60 may also or alternatively include a surface texture (e.g., a sand texture) that is different (e.g., rougher) than the rest of fender flare 56 and provides a grip that is less likely to slip. This surface texture may be molded into handle 60 or applied as a coating to handle 60 after formation, as desired. It is contemplated that handle 60 may have only ribs 66, only surface texture 68, or both ribs 66 and surface texture 68.

Handle 60 may be generally hollow, with a cross-section having a general U-shape (see dashed lines labeled 69 in FIG. 4). Handle 60 may be open at an internal side of fender flare 56, and include a weep hole 70 formed at a gravitationally lowest point within a trough of the U-shape. The U-shape of handle 60 may provide comfort to the operator and structural strength. Weep hole 70 may allow collected debris and/or moisture to drain out of handle 60. It is contemplated that handle 60 could alternatively be completely enclosed, if desired.

Mud guard 52 may have spacing and/or a shape that facilitates use of handle 60. In particular, when hood assembly 20 is in the closed position, a gap 72 (see FIG. 4) may exist between a lowest point of handle 60 and upper surface 55 of mud guard 52 that is located immediately below handle 60. A dimension of gap 72 may be selected to provide clearance for a gloved hand to fit between fender flare 56 and upper surface 55 and comfortably grasp handle 60. Gap 72 may be about 0.75-1.25 inches, in one exemplary embodiment. In addition, while mud guard 52 includes internal wall 53 that is vertically overlapped by fender 24 when hood assembly 20 is closed, a shape of wall 53 may be inverted relative to the shape of handle 60. That is, wall 53 may angle inward toward traction device 18 (referring to FIG. 1), while the L-shape of handle 60 angles outward. This inverted shape of mud guard 52 may help to create a space 76 (see FIG. 4) between internal wall 53 and handle 60 that allows an operator's fingers to curl around an internal side of handle 60.

FIGS. 6 and 7 illustrate an alternative fender flare 78 that may be paired together with modesty panel 54 (referring to FIG. 2) to form fender 24. Like fender flare 56 of FIGS. 3-5, fender flare 78 of FIGS. 6 and 7 may form a portion of forward end 40, a portion of trailing end 42, a portion of top side 44, and all of outer side 46 of fender 24. Fender flare 78 may be a generally four-sided structure, and include step 58 at an external vertical edge of outer side 46 for added rigidity. In contrast to fender flare 56, however, fender flare 78 may include a different means for lifting hood assembly 20. That is, fender flare 78 may not include handle 60.

Fender flare 78, along with fender 24 and all of hood assembly 10, may be tilted about hinge(s) 26 by the operator of machine 10 lifting upward on fender flare 78 without the use of a handle. Specifically, the operator may apply an upward lifting force directly to fender flare 78 at the rear-most intersection of outer side 46 and trailing end 42. For example, the operator may generate an upward force at only outer side 46 adjacent trailing end 42, at only trailing end 42 adjacent outer side 46, or simultaneously at both locations. Care should be taken when doing this, however, to ensure that damage (e.g., warping, bending, or tearing) of fender 24 and/or hood assembly 20 does not occur.

To help reduce a likelihood of damage being caused to fender 24 during lifting at fender flare 78 without the use of a handle, the structure of fender flare 78 may be reinforced at the lifting location. For example, in the embodiment of FIG. 7, a four-sided box 80 having an open top and an open bottom may be disposed inward of trailing end 42 and outer side 46, such that a space 82 exists around box 80. Two sides 84, 86 of box 80 may be generally parallel with outer side 46; one side 88 may be generally perpendicular to outer side 46; and the remaining side 90 may be inclined toward side 88 and generally perpendicular to outer side 46. In one embodiment, side 90 may be generally parallel to trailing end 42. A plurality of spaced-apart ribs 92 may extend outward from trailing end 42 and outer side 46 through space 82 to sides 90 and 88 of box 80, respectively. Ribs 92 may vary in height, having a greatest height located furthest away from a lower terminus of trailing end 42 and outer side 46 (i.e., ribs 92 may taper away from box 80). Ribs 92 may also have a length about the same as a length of sides 88 and 90, and a thickness about the same as the sides of box 80. In some embodiments, ribs 92 may also be present along the terminus of outer side 46 past side 88 of box 80. Box 80 and ribs 92 may be integrally formed with fender flare 78, or separately formed and thereafter connected to fender flare 78, as desired. The use of box 80 together with ribs 92 may increase a rigidity of fender flare 78 at trailing end 42. And this increased rigidity may help to transfer a greater amount of force from the operator to fender 24 during lifting, with reduced warping, bending, or tearing.

Although fender flares 56 and 78 are shown as two separate embodiments, it is contemplated that the two embodiments could alternatively be combined, if desired. For example, a single fender flare could be provided with external handle 60 and the internal structure of box 80 and ribs 92. This combination of features could ease lifting of hood assembly 20 and simultaneously improve the structural strength of fender 24.

INDUSTRIAL APPLICABILITY

The disclosed hood assembly may be applicable to any mobile machine where light-weight, durable protection from wheel-thrown mud and debris is desired and quick reliable access to the power source of the machine is needed. The disclosed hood assembly may provide protection from mud and debris by the incorporation of fenders within the assembly. The disclosed hood assembly may improve access to the power source via handles formed within the fenders at a end location opposite a pivot point of the hood assembly. Operation of hood assembly 20 will now be described in detail.

In conventional machines, the procedure followed to gain access to the machine's engine includes releasing a first latch located at a first side of the machine, and then moving around the machine to an opposite side to release a second latch. The operator or service technician then moves back to the front of the machine, reaches up over the hood and grasps a center-mounted handle. Pulling this handle downward with sufficient force creates a forward torque, causing the hood to pivot toward the operator. To then prepare the machine for travel (after any maintenance is performed), the operator then moves to the front of the machine and pushes upward on the hood. This upward movement creates a reverse torque, causing the hood to pivot backward over the engine toward the operator station. The operator then moves to the first side and re-engages the first latch, and then moves to the second side and re-engages the second latch.

In the disclosed example of hood assembly 20, the time and effort required to perform the same maintenance described above may be reduced. For example, the operator may need to release a first latch 38 at a first side of machine 10, and then move to a second side of machine 10 and release a second latch 38. While still at the second side of machine 10, the operator may then pull or push upward on handle 60, creating torque sufficient to pivot hood assembly 20 forward about hinge 26. A reverse operation may then be completed to return hood assembly 20 to its closed position and secure latches 38. With this procedure, at least one step (i.e., moving to the front of the truck and pulling down on the center-located handle) may be omitted from each of the opening and closing events.

In addition to saving time and effort through process simplification, the disclosed example of hood assembly 20 may also reduce an amount of force required from the operator to gain access to power source 14, and also allow the operator more secure footing. Specifically, for operators of reduced stature, it may be easier to grasp handle 60 and push upward than to reach for a top-mounted handle and pull downward. In addition, the operator may be able to stand on a ground surface (and/or on a step of machine 10) during these events (as opposed to a bumper or step stool), thereby providing for the secure footing. Further, less force may be required to generate the opening torque from the location of handle 60 than from the top of hood assembly 20.

It will be apparent to those skilled in the art that various modifications and variations can be made to the disclosed hood assembly without departing from the scope of the disclosure. Other embodiments of the hood assembly will be apparent to those skilled in the art from consideration of the specification and practice of the hood assembly disclosed herein. It is intended that the specification and examples be considered as exemplary only, with a true scope being indicated by the following claims and their equivalents.

What is claimed:

1. A fender for a traction device, comprising:
   a generally four-sided structure configured to extend in a width direction of the traction device, the generally four-sided structure having a leading end and a trailing end relative to forward travel direction of the traction device, a top side, and an outer side; and
   a handle formed at least partially within the trailing end and the outer side, wherein the handle is recessed within the generally four-sided structure and has a generally U-shaped cross section.

2. The fender of claim 1, wherein the handle is located at a rear most corner of the fender formed by an intersection of the trailing end and the outer side.

3. The fender of claim 1, wherein the fender includes:
   a modesty skirt; and
   a fender flare connected to an outer edge of the modesty skirt, the handle being formed within only the fender flare.

4. The fender of claim 3, wherein the modesty skirt is integrally connected to an engine hood.

5. The fender of claim 3, wherein the handle is molded into the fender flare.

6. The fender of claim 5, further including at least one fastener configured to connect the fender flare to the modesty skirt at the handle.

7. The fender of claim 3, further including:
   a box formed inside the fender flare and spaced apart from walls of the fender flare; and
   a plurality of ribs extending from the walls of the fender flare to the box,
   wherein the box and the ribs are integrally formed with the fender flare.

8. The fender of claim 1, wherein the handle is generally shaped.

9. The fender of claim 8, wherein the handle has a texture that is rougher than a texture of the generally four-sided structure.

10. The fender of claim 1, wherein the handle includes a plurality of raised external ribs extending in a length direction of the handle.

11. The fender of claim 1, wherein the handle is generally hollow, and includes a weep hole formed within a gravitationally lowest portion of the handle.

12. A hood assembly for a machine having a power source and an operator station, the hood assembly comprising:
   a hood configured to at least partially cover the power source;
   a hinge located at an end of the hood away from the operator station;
   a fender located at a transverse side of the hood; and
   a handle formed within one of the fender and the hood at an end near the operator station, wherein the handle is recessed within the fender and has generally U-shaped cross section.

13. The hood assembly of claim 12, wherein the fender includes:
   a modesty skirt integral with the hood; and
   a fender flare connected to an outer edge of the modesty skirt, the handle being formed within only the fender flare.

14. The hood assembly of claim 13, wherein:
   the hood and modesty skirt are fabricated from a first material; and
   the fender flare and handle are integrally molded from a second material that is more flexible than the first material.

15. The hood assembly of claim 14, wherein:
   the handle is formed at a rearmost outer corner of the fender flare; and
   the hood assembly further includes at least one fastener connecting the fender flare to the modesty skirt at the handle.

16. The hood assembly of claim 12, wherein the handle includes at least two segments formed into a general L-shape, such that an operator can open the hood from a first location at a side of the fender and from a second location rearward of the fender by lifting upward on each of the at least two segments of the handle.

17. The hood assembly of claim 16, wherein the handle includes:
   a plurality of raised external ribs extending in a length direction of the handle; and
   a texture that is rougher than a texture of the fender flare.

18. The hood assembly of claim 12, wherein the handle is generally hollow, and includes a drain hole formed within a gravitationally lowest portion of the handle.

19. A mobile machine, comprising:
a frame;
an operator station supported by the frame;
a power source supported by the frame forward of the operator station relative to a forward traveling direction of the mobile machine;
at least one traction device rotatably connected to the frame;
a mud guard located between the at least one traction device and the operator station the mud guard being operatively connected to the frame;
a hood configured to at least partially cover the power source;
a hinge operatively connected to the frame and to the hood at an end of the hood away from the operator station;
a fender fixedly connected to a transverse side of the hood and configured to abut the mud guard and at least partially enclose the at least one traction device when the hood is in a closed position, wherein the fender includes a modest skirt;
a fender flare connected to an outer edge or the modesty skirt; and
a handle formed within only the fender flare at an end near the mud guard.

* * * * *